Patented Oct. 14, 1947

2,428,910

UNITED STATES PATENT OFFICE 2,428,910

PREPARATION OF A POROUS ALUMINUM CHLORIDE CATALYST

Arch L. Foster, Bartlesville, Okla., assignor to Phillips Petroleum Company, a corporation of Delaware No Drawing. Application May 18, 1942, Serial No. 443,489

4 Claims. (Cl. 252—259.2)

This invention deals in general with the preparation of catalytic masses and more specifically it relates to methods for increasing the contact surface area of catalysts.

The rapidly increasing importance of catalysts in all chemical fields and especially in the field of petroleum refining and the manufacture of greatly improved products from petroleum hydrocarbons makes the development of more efficient and effective catalysts of tremendous economic as well as technical importance. Catalysts are being applied to the solution of technical refining problems in the production of an increasingly long list of commercial materials from petroleum; many synthetic products can be made only with the aid of catalysts.

One of the primary conditions which must be met by the catalyst is efficient and intimate contact between it and the reacting materials. One group of investigators into the realm of catalysis believe that surface contact controls the action of the catalyst and that catalysed reactions take place on the surface of the catalyst. The catalytic effect is considered to be greatest on the edges, points and corners of crystalline or amorphous bodies. The action of the catalyst is not well understood, and this invention is not based on or limited by any theoretical concepts of catalytic phenomena but only on observed results divorced from any theory.

A catalyst therefore should meet at least three primary requirements. It must possess to an extraordinary degree the property of promoting reactions which occur either not at all or with much less ease and readiness in its absence. This is a property inherent in the materials employed as a catalyst, a property which cannot be imparted to a non-catalytic body by any known means. The catalyst must present the largest practicable surface area with which the reacting materials may be brought into contact, that is, it must have the greatest possible surface-volume ratio. Finally, it must be rugged enough to withstand for long periods the conditions under which it is used. Moreover it should be relatively easy to regenerate.

Numerous methods for extending the surface area of catalysts are known to the art. One of the oldest processes, employed particularly with metal catalysts, is the precipitation of the catalyst, such as the metal, in very finely comminuted condition on the surface of a relatively inert carrier or supporting material. In such manner the ratio of surface to volume of catalyst is increased manyfold over that which obtains when the catalyst, such as the metal, is employed as its own support in comparatively massive form. Non-metallic catalysts do not in general lend themselves as well to this type of extreme subdivision and other methods are employed, such as evaporating a solution of the catalyst material on the surface of a carrier, spreading the catalyst in a thin paste or layer on a carrier, increasing the porosity of the catalyst material itself, etc.

The principal object of this invention is to provide an improved process for the preparation of catalysts. Another object is to provide a process of preparing improved catalysts. Another object is to provide a process of preparing porous catalysts. Still another object is to provide a process of preparing porous aluminum chloride catalysts. Numerous other objects more fully appear hereinafter.

In accordance with my invention, I prepare a porous solid catalytic material in the desired shape by mixing the particulate solid catalytic material with a removable solid, forming the mixture into the desired shape, and removing the removable pore-forming solid from the shaped form without affecting the structure of the catalyst itself so as to give a porous body of the solid catalytic material.

The removable pore-forming solid may be substantially more volatile than the catalytic material, in which case it will be removed by vaporization from the shaped article without affecting the catalyst structure. Alternatively it may be a solid which is decomposable to gases upon heating to a temperature which does not cause melting or objectionable vaporization of the catalytic material. Thus the pore-former is convertible to the gaseous state much more readily upon the application of heat than the catalyst and without objectionable destruction of the porous structure of the catalyst.

In another embodiment the pore-forming solid may be a material which is readily soluble in a solvent which is a non-solvent, or substantially a non-solvent for the catalyst. Thus the pore-former may be removed from the shaped catalyst mass without affecting its structure by leaching with this solvent.

The pore-former should be substantially a non-solvent for and immiscible with the catalyst either at ordinary temperatures or at any elevated temperature used to remove or aid in the removal of the pore-former. Thus glazing of the catalyst, fluxing thereof by the pore-former, or other interference with the microscopic or macroscopic porous nature of the catalyst is avoided.

Following intermixture of the catalyst particles with the particulate pore-forming solid, the mixture is shaped in any suitable manner as by molding, compression, pelleting, or the like. If an inert binder for the catalyst particles is present the shaping may be accompanied by bonding of the catalyst particles together at the points of contact. In any event the action of the shaping is to form two interlacing phases each of which is continuous, as in a sponge, and upon removal of one of these phases, namely the pore-forming phase, the catalyst phase is left in porous form.

The shaping may cause coalescence of the catalyst with itself and similar coalescence of the pore-former. To aid in this coalescence or bonding, moderately elevated temperatures may be employed. In some cases binders or fluxes capable of causing bonding at the points of contact may be present. Such fluxes should flux only the pore-former or the catalyst but should not cause fluxing of catalyst with pore-former.

If the molding or shaping is carried out in a closed space so that gaseous pressure is retained, it may be conducted at a temperature sufficiently elevated to effect coalescence of the particles of the catalyst or the pore-former by melting or at least superficial fusion under the conditions of mechanical pressure and temperature employed, following for example the principles of my co-pending application Serial No. 440,561, filed April 25, 1942. now U. S. Patent 2,408,164, issued September 24, 1946.

In some cases the pore-former, which is volatilized or decomposed to gases by heating to a temperature insufficient to melt the catalyst or injure the structure of the catalyst and thereby remove it from the shaped catalyst body, may be driven off under such conditions that not only is it removed but volatilization of the catalyst (especially in the case of aluminum chloride or the like metal halide) surrounding the void thereby formed takes place, whereby even larger pores are formed in the catalyst mass.

The pore-forming solid and the catalyst are brought into a very intimate mixture in any suitable manner, as, for example, by mixing, grinding together or both.

Where the pore-former is readily volatilized or decomposed to the gaseous state, it may be still more advantageous to incorporate it in the form of a solution, preferably a concentrated solution, in a solvent in which the catalytic material is essentially insoluble. Following intermixture the solvent may be evaporated by drying, and the pore-former then volatilized out without appreciably or objectionably affecting the catalyst structure. Shaping of the mass may take place before, during or after removal of the solvent but before removal of the solid pore-former. The point at which the mass is shaped may depend upon the relative amount of the pore-forming solution employed and upon the consistency of the mixture resulting from the preliminary mixing step.

While the procedure described in the preceding paragraph may be employed where use is made of a soluble pore-forming solid with subsequent dissolution in a solvent therefor, however, this mode of introducing the pore-former is ordinarily not as advantageous in such an embodiment as in the embodiment where the pore-former is volatile and is removed by volatilization.

This invention involves a process for preparing catalysts in which the surface area exposed to contact with reactants is multiplied by forming the catalyst into a highly porous state by methods which improve the efficiency of the catalyst so prepared over that of catalysts prepared by known processes. The principle involved is that of incorporating in the body of a more or less finely comminuted catalytic material a foreign substance which may be removed from the mass after the catalyst is prepared, essentially in the form in which it is to be used, without disturbing the structure of the catalyst.

The form or condition in which catalyst and pore-forming material may be used when beginning manufacture of the finished product is determined by the nature of the two or more materials, by the nature of the reaction and the materials to be reacted by its aid, and to some degree by the kind of by-products formed during the operation of the process. A catalyst used in a process wherein by-products are formed which tend to cover and coat the catalyst surface normally requires a larger pore size than one which does not form such coating and blanketing materials. Similarly, a catalyst for use in treating a heavy viscous liquid requires larger pore spaces than one which is brought into contact with non-viscous liquids, or gaseous or vaporized charge stocks. In treating vapors the catalyst interstices may vary from very minute openings visible to the unaided eye to capillaries discernible only under a powerful microscope. With the formation of sludgy, tarry by-products the smaller the pore openings the sooner the catalyst is insulated against contact with the reactants and the sooner it must be regenerated. The effective surface area of a porous catalyst may be reduced by careless methods of forming it into pellets or pieces, by too fine comminution or by heating to too high temperature approaching the melting point of the material during the removal of the pore-former.

For purposes of description, solid catalysts may be divided into two general classes: those volatile at relatively low temperatures, and those volatile only at extremely high temperatures or not at all volatile. This division is somewhat arbitrary but is useful. The volatile type of catalyst is typified by the metal halides, such as aluminum chloride, and the non-volatile by metal oxides, particularly oxides of the heavy metals.

In general, the metal halides are differentiated from other major types of catalysts by higher volatility, which in the majority of cases enables them to be sublimed for purification or recovery, and by their greater and more definitely crystalline structure at ordinary temperatures. A few halides of this class are liquid at room temperature, such as tin and titanium chlorides. When these liquid materials are used, they should be carried on a porous adsorbent support or otherwise solidified. Production of the metal halides in porous catalyst form requires solution of a number of problems. When they are to be rendered porous by vaporization of a volatile pore-former the volatility of the volume-expanding material must be appreciably higher than that of the catalyst. Especially in the case of aluminum chloride, vaporizing at about 361° F., the volatile material mixed with it for porosity should boil or vaporize at not higher than about 325° F. and preferably not above about 300° F., in order to reduce the loss of catalyst during the vaporizing step to negligible proportions. However, where the loss of catalyst by vaporization occurs in the catalyst shape in the immediate vicinity of the particles of non-catalytic volatile pore-forming material being removed, porosity will be still further increased thereby and the vaporized catalyst may be recovered by sublimation or condensation along with the recovery of the non-catalytic pore-forming material. In such case, volatilization of catalyst is not objectionable because the structure of the catalyst is not substantially or deleteriously affected and, in fact, its porosity is still further increased.

Greater latitude is permissible in the choice of a pore-forming material to be employed with the non-volatile oxide type of catalyst. Fusing at temperatures far above the fusing point of the materials blended with them, these catalysts vaporize at such extremely high temperatures that loss of any catalytic material by volatilization is practically impossible under any conditions employable in proceeding in accordance with this invention. Preparation of porous catalyst forms with these heavier type materials therefore is simpler than with the more volatile types. Pore-forming materials may be removed more easily and effectively from the non-volatile materials either by solvent action or by volatilization than from the metal halide catalyst. Control of conditions of preparation of the latter type catalyst must be much more exact but the improvement of efficiency of the halide catalyst is, if anything, greater by the process of this invention than for any other type.

The general method of preparation of both types of catalysts is the same, and is shown by the following description. Specific variations from this process here outlined may be dictated by specific differences in the individual materials being processed but the general plan and procedure is the same for all types.

The catalytic material is employed preferably in crystalline form, and may be entirely dry and free from water or other mother liquid used for its preparation, or may be moist to any desired degree, usually not to an extent which will tend to dissolve the pore-forming material. The particle size of the catalytic material is determined by the condition in which it is desired in the finished product and, if the crystals or particles are relatively soft and tend to be crushed during the pelleting operation, the material may be employed at the beginning in the form of relatively large crystals or particles. Finer comminution may be obtained by crushing, grinding, tumbling in a ball or rod mill or by any other satisfactory means.

The preferred method of mixing two or more solids, especially when using materials of high and general solubility in most common solvents, is by mixing in the dry state. However, mixing may be carried out when one or more of the components may be in slightly moist condition but dry enough to avoid agglomeration of particles. When thoroughly mixed to the degree desired the mixture is pelleted by any of the means well known to the art, under the temperature and pressure conditions which have been determined as optimum for that particular combination of materials. It must be kept in mind that an intimate mixture of crystals or particles of dissimilar composition will melt at a temperature lower than that of either material in the pure state, and in the pelleting, drying and vaporizing steps the temperature at which each shall be carried out for the best results must be determined and rigidly adhered to, especially with the more highly volatile materials such as the metal halides.

After the pelleting operation, if the mixture is to be dried or freed from solvent this drying may be carried out in an oven or dryer of any desired type until the required degree of dryness is attained. With materials which form pellets of less strong and rigid structure it is preferable that this drying be completed before starting to remove the pore-forming materials, either by heat or by solvents, otherwise the sudden formation of solvent vapors may tend to rupture the pellet structure. Therefore the drying should be carried out at the lowest practicable temperature, say 215–220° F. when water is to be removed. One good method to employ with the less rigid pelleted material is by carrying the pellets from the pelleting machine continuously on a belt or other type of conveyor through a drying oven en route to the main unit where the pore-forming material is removed from the pellets.

When thoroughly dry and free from solvent or other liquid material the pellets are introduced into the unit for the removal of pore-forming materials. This may be an oven where the catalyst is exposed to heat from any desired source, such as hot gases free from water vapors, or by radiations from the oven walls or both. Whatever the means employed, the space through which the pellets pass should be swept by warm gases to aid in the removal of the vapors of the pore-forming material being removed, as by so doing the removal may be accomplished more speedily, uniformly and at a lower temperature. Less rugged, more volatile type catalyst pellets may preferably be spread in thin layers on trays, a belt or other means of handling. The trays, for example, may be placed in racks or frames which may be carried continuously through the vaporizing zone, or may be placed therein for a predetermined time and then removed when the pore-forming material has been driven off, as the operator may choose and as is permitted by the design of the unit. Less care is required for the more rugged, metal oxide type of catalyst in these steps.

When the pores to be produced in the finished catalyst are to be microscopic in size the catalytic material and the pore-forming material may be melted together, solidified, and broken up or formed into pellets or granules. These particles may be leached in a solvent which will remove the pore-former but in which the catalyst is insoluble, at elevated temperatures and for periods of time consistent with those required to remove essentially all of the pore-former. This method may well be employed with a catalyst of rugged character and which is to be used in a process where stoppage of the minute pores is minimized, or where regeneration of the catalyst by removing pore-stopping products is employed advantageously. This method of melting the two or more products together gives a catalyst of high efficiency for certain types of reactions. The solution of pore-former in the solvent may be drawn off and the catalyst washed, as with fresh solvent, to remove traces of material remaining after which it is dried in a manner similar to that mentioned above in connection with the drying after the pelleting.

Another method by which very small, microscopic pores may be prepared in a catalytic material is by moistening the smaller particles of the catalyst with, for example, a saturated solution of the pore-forming material to the extent of covering the major part but not all of the catalyst surface with the material, drying the particles to the degree found to be optimum for that particular combination, pelleting the catalyst with this partial coating of pore-former, and removing the latter by heat, solvent or in any other practicable manner. If a solvent is employed which may tend to dissolve the catalyst or in which the catalyst may be slightly or appreciably soluble, this solvent may be saturated with the catalyst before applying it to the catalyst material, to reduce or eliminate its action on the catalyst while removing the pore-former.

In the following tabulation are given the boiling and/or melting points of some volatile or readily decomposable materials which may be employed with advantage as pore-forming materials in combination catalytic products as outlined above. The list of usable materials is by no means exhausted by this tabulation, which is given here purely as illustrative of the materials which may be used for this purpose.

| Compound | Melting Point, °F. | Boiling Point, °F. |
|---|---|---|
| Ammonium Carbonate | [1] 134.6 | |
| Ammonium Chloride | [1] 662 | [3] 968 |
| Ammonium Acetate | 237 | ([1]) |
| Ammonium Benzoate | 388.4 | |
| Ammonium Formate | 237.2 | [1] 356 |
| Ammonium Nitrate | 337 | [1] 410 |
| Ammonium Oxalate | ([1]) | |
| Ammonium Phenolate | | |
| Ammonium Propionate | [1] 113 | |
| Ammonium Tartrate | ([1]) | |
| Naphthalene | 176 | 424 |
| Acetaldehyde-Ammonia | 206.6 | [1] 212 |
| Anthracene | 420 | 644 |
| Resorcinol | 230 | 530 |
| Catechol | 347 | [2] 473 |
| Hydrazine Formate | [2] 262 | |
| Hydrazine Oxalate | [2] 298 | |
| Hydrazine Sulfate | [2] 185 | |
| Hydroxylamine Sulfate | [1] 338 | |
| Hydroxylamine Chloride | [1] 304 | |
| Diethyl Tartrate | 62.6 | 536 |
| Dimethyl Tartrate | 194 | 540 |
| Phenol | 106 | 360 |

[1] Decomposes.  [2] Slight decomposition.  [3] Sublimes.

Several precautions must be observed in selecting the pore-forming material to be employed with any given catalyst. The material must not be a bonding agent, or its removal may destroy partially or entirely the pellet structure of the finished product, defeating the purpose of the process. The pore-former must not be a solvent for the catalyst or at least its solvent action must be relatively negligible if and when it liquefies before it decomposes or vaporizes in the last step of the process. Small traces of the pore-former, if allowed to remain in the finished catalyst, must not have a deleterious effect on the activity of the catalyst and must not form objectionable products during the operation wherein the catalyst is used. In some cases, such as, for example, when ammonium chloride is employed with metal halides which may be used in processes wherein a hydrogen halide is used as a catalyst activator, the pore-former may be beneficial in small amounts for supplying hydrogen chloride to the reactant materials during the process.

A few examples of the numerous combinations of pore-former and catalyst are given here merely to illustrate the process of the invention. The invention is not limited in any way to or by these procedures mentioned in these examples since the principles may be applied in many other combinations of material and procedure not outlined specifically herein.

*Example 1*

Nine parts of roughly crystalline or granular aluminum chloride are mixed without substantial crushing or pulverizing with one part of ammonium carbonate in small lumps or granules ranging to 0.2-inch diameter. When the materials are intimately mixed the granular mass is pelleted under a pressure of 50 lbs. per sq. in. in a machine forming pellets of one to one and one-half inches maximum dimension, maintaining an elevated temperature of the mixture such that no appreciable volatilization occurs but promoting bonding of the chloride at about 100–120° F. The pellets are heated by passing on a conveyor belt of open-mesh construction through an oven at a temperature of 150–175° F., the rate of passage and of heating being maintained such that by the time the pellets are ready to pass from the oven substantially all the carbonate has been decomposed and volatilized, and keeping a stream of inert, water-free gas or deoxygenated air passing through the oven meanwhile. The vapors and gases from the oven are passed through a subliming chamber to condense any catalyst which may be driven off during the operation of volatilizing the carbonate. The resulting catalyst is cooled, and has an open, porous structure facilitating contact with reaction materials, the pores varying in size from microscopic to openings the size of the largest pieces of carbonate under the pressure employed in pellet formation. This type of structure is especially advantageous when the catalyst is employed for promoting reactions in which eventually deposits of tarry or sludgy material are formed on the catalyst since the larger pore structure lengthens the time when the catalyst is covered by this deposit and when its pores are entirely clogged so that the catalyst must be discarded or regenerated. In such form contact between catalyst and reacting materials is more efficient and may be continued for a longer time than is the case with any other solid pellet form of this type of catalyst.

*Example 2*

Seventeen parts of medium-to-coarse granulated chromic oxide is moistened with a saturated water solution of catechol containing three parts of catechol. The moist material is pelleted under a pressure of 120 pounds per square inch and at a temperature of 190–200° F. in the form of grooved cylinders ½-inch in diameter and 1 inch in length. The pellets are dried at 220–250° F. by heating them slowly to that temperature and maintaining them thereat for one hour. The temperature is then increased gradually over a period of one hour to about 500° F. and is maintained thereat for a period of two hours. The catalyst is cooled in the absence of air and water vapor and stored in closed containers until used. This catalyst under the low-power microscope shows a porous structure which gives extremely high efficiency for contact catalysis of both liquid and vapor reactants and permits burning out combustible by-products during regeneration with a minimum of damage to the pellet structure and to its porous state.

*Example 3*

A mixed molybdic oxide-aluminum oxide ($MoO_3$—$Al_2O_3$) catalyst material in medium-to-fine granular condition is mixed intimately with 20 per cent of its volume of ammonium nitrate. This mixture is pelleted at 300–350° F. and 250–1000 pounds per square inch pressure into thin-walled cylinders with corrugated wall surfaces, one-inch by ½-inch in size. The resulting pellets are cooled to 100–150° F. and treated with water at that temperature range for two hours under 100 pounds included pressure, circulating the water through a closed system for complete contact with the catalyst. This leaching operation must be continued until the dried pellets show a constant weight and two to four hours will be found sufficient in most cases. The catalyst pellets are removed from the water, dried at 220–230° F. for one hour and are then heated at 400–450° F. for another hour to volatilize any traces of nitrate which may remain in the catalyst. The resulting catalyst is highly efficient especially for contacting vapor or liquid reactants under elevated temperatures and pressures and where removal of by-products must be made without damaging the catalyst or its macroscopically porous structure.

The pore-forming material employed in the practice of this invention may be recovered in any convenient manner and re-used for formation of subsequent batches of catalyst. Volatilized material may be condensed or sublimed and so recovered; dissolved material such as sodium chloride or soluble sulfates, etc., may be concentrated by any of the convenient methods well known to the chemical industry, and so recovered in crystalline or amorphous form for re-use. Recovery of the pore-former is especially desirable if its initial cost is high, to thus reduce the over-all catalyst cost.

In pelleting catalytic materials which do not possess the required bonding characteristics a bonding agent may be employed to achieve the desired rigidity of structure, using a bonding material which is not affected or appreciably removed by subsequent treatment such as removal of the pore-forming constituent. In some cases the pore-former may have the requisite bonding properties, and the later treatment may be such as to allow a small portion of the pore-former to remain as a bonding agent. The bond material may be for example an alkyd resin mixed with granular or crystalline or amorphous catalyst material as a powder or finely divided material which under elevated temperature and pressure conditions will fuse in small units and so bond the catalyst particles together without coating the entire surface of the catalyst particles with a continuous and impervious sheath, masking its contact with the reactants and thus its catalytic action. Alkyd and styrene resins and many other types available commercially may be used for this purpose, the specific product selected for any given application being determined in the light of the properties of catalyst and pore-forming materials and the requirements for forming the catalyst and its application in process operations.

I claim:

1. A process for the production of a porous aluminum chloride catalyst which comprises mixing particulate solid aluminum chloride with particles of a normally solid substance that is inert with respect to aluminum chloride, is not miscible with aluminum chloride in the molten state, and that has a melting point and a volatilization point below approximately 325° F., forming the mixture into molded coherent masses having the desired shape, and thereafter heating said molded masses at a temperature below approximately 325° F. but sufficiently high to volatilize said normally solid volatile substance and for such period that the said volatile solid substance is volatilized substantially completely to leave porous masses of aluminum chloride having substantially the same form as the original molded masses.

2. A process as defined in claim 1 in which the normally solid substance that is mixed with the aluminum chloride is ammonium carbonate.

3. A process as defined in claim 1 in which the normally solid substance that is mixed with the aluminum chloride is ammonium acetate.

4. A process of preparing a porous aluminum chloride catalyst which comprises mixing particulate aluminum chloride with a smaller amount of particulate ammonium carbonate, subjecting small portions of said mixture to molding at a pressure of approximately 50 lbs. per square inch and at a temperature of approximately 100° F., and thereafter heating the molded masses at a temperature between about 150° and 175° F. for a period sufficient to drive off ammonium carbonate substantially completely and leave porous masses of aluminum chloride having substantially the same form as the original molded masses.

ARCH L. FOSTER.

REFERENCES CITED

The following references are of record in the file of this patent:

UNITED STATES PATENTS

| Number | Name | Date |
| --- | --- | --- |
| 1,115,776 | Bosch et al. | Nov. 3, 1914 |
| 1,204,142 | Ellis | Nov. 7, 1916 |
| 1,935,176 | Connolly | Nov. 14, 1933 |
| 1,915,473 | Raney | June 27, 1933 |
| 2,139,026 | Matheson | Dec. 6, 1938 |
| 2,122,053 | Burkhardt | June 28, 1938 |
| 2,208,362 | Engel | July 16, 1940 |
| 2,295,977 | Thomas et al. | Sept. 15, 1942 |

FOREIGN PATENTS

| Number | Country | Date |
| --- | --- | --- |
| 6,828 | Great Britain | Dec. 30, 1901 |